Aug. 21, 1923.
J. BRANDENBERG ET AL
1,465,708
TRAFFIC SIGNAL
Original Filed Oct. 12, 1922   2 Sheets-Sheet 1
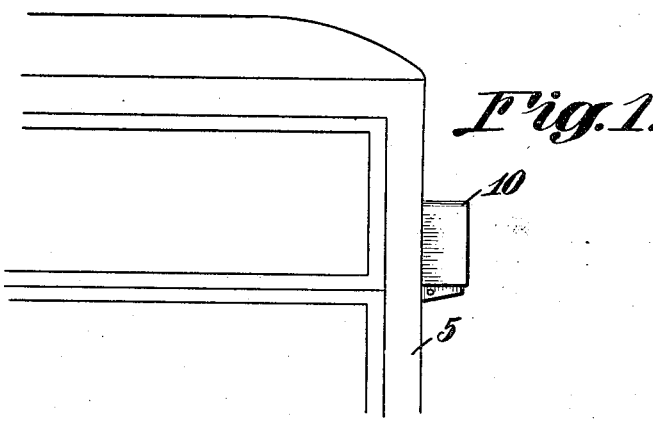
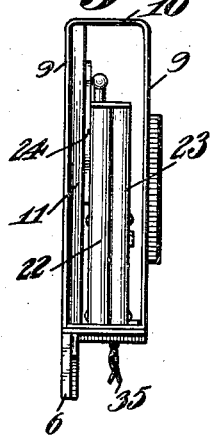
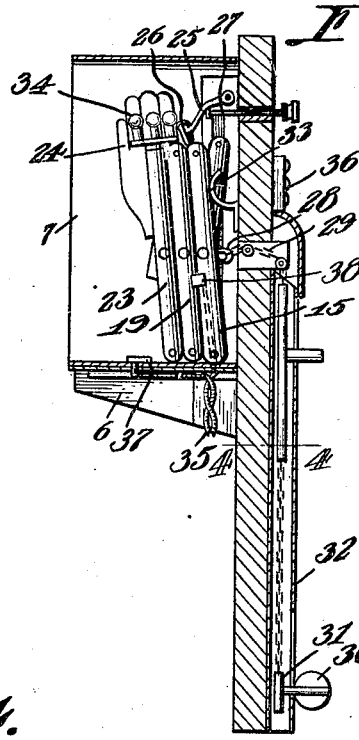
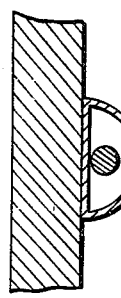
Inventor
J. Brandenberg AND
W. W. Smith
By C. A. Snow & Co.
Attorneys Aug. 21, 1923.
J. BRANDENBERG ET AL
1,465,708
TRAFFIC SIGNAL
Original Filed Oct. 12, 1922  2 Sheets-Sheet 2
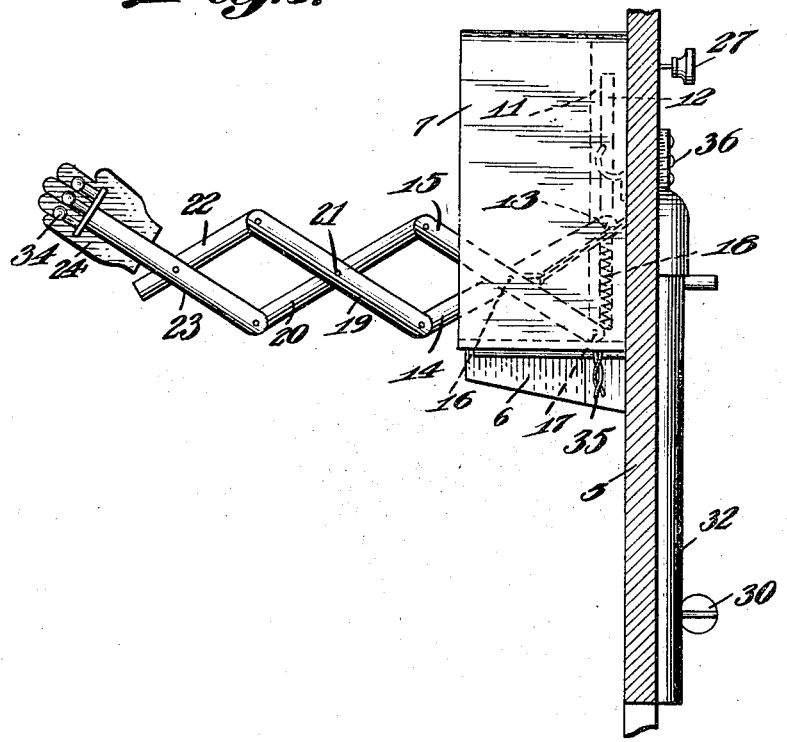
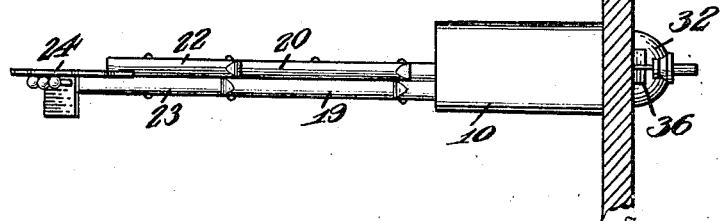

Patented Aug. 21, 1923.

1,465,708

UNITED STATES PATENT OFFICE.

JOHN BRANDENBERG AND WALTER W. SMITH, OF SAULT STE. MARIE, MICHIGAN.

TRAFFIC SIGNAL.

Application filed October 12, 1922, Serial No. 594,078. Renewed June 28, 1923.

*To all whom it may concern:*

Be it known that we, JOHN BRANDENBERG and WALTER W. SMITH, citizens of the United States, residing at Sault Ste. Marie, in the county of Chippewa, State of Michigan, have invented new and useful Traffic Signals, of which the following is a specification.

This invention relates to indicators, and more particularly to manually controlled indicators designed for use on motor vehicles for indicating the direction of travel to be taken by the vehicle equipped with the device.

Another object of the invention is to provide a signaling device of this character which may be readily and easily operated from a point within a closed car, eliminating the necessity of the operator opening the window or door adjacent to the driver's seat to indicate by his hand, the direction of travel to be taken by the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:

Figure 1 is a fragmental elevational view of the forward portion of a motor vehicle, disclosing the device as secured thereto.

Figure 2 is a front elevational view of the signaling device.

Figure 3 is a vertical sectional view through the signaling device.

Figure 4 is a sectional view on line 4—4 of Figure 3.

Figure 5 is an elevational view disclosing the indicating device in its extended position.

Figure 6 is a plan view thereof.

Referring to the drawings in detail, the reference character 5 designates the body portion of the vehicle to which the signal is attached.

The signal embodies a bracket member 6 providing a support for the housing or body portion of the signal indicated at 7, the housing including spaced walls 9 and an upper wall 10, and being of a construction to completely house the signaling arm when in a folded position.

Supported within the housing is a plate 11 provided with an elongated opening 12 to accommodate the pin 13 to permit the same to move throughout the length of the plate 11. The pin 13 is carried by the bar 14 which is pivotally connected to the bar 15 as at 16. These bars 14 and 15 form the innermost section of the lazy tong construction, and as shown, the bar 15 has pivotal connection with the plate 11 as at 17. In order that the inner ends of the bars 14 and 15 may be moved towards each other, when the latch mechanism of the device is released, a coiled spring 18 is provided which is extended when the arm or signal is moved to its inactive position. The central section of the lazy tong construction embodies the bars 19 and 20 which are pivotally connected as at 21 and have their outer ends pivotally connected to the bars 22 and 23 respectively, the bar 23 being longer than the bar 22, to support the member 24 which is formed of transparent material and constructed to simulate a person's hand.

At the upper end of the plate 11, is an arm 25 provided with a hook member 26 adapted to engage between adjacent sections of the lazy tong construction to hold the signal in its inactive position within the housing. An operating rod indicated at 27 extends through an opening formed in the body portion, the inner end of the rod 27 contacting with the arm to move the arm out of engagement with the lazy tong when the rod 27 is moved inwardly by the operator. It will be seen that as the member 25 is moved upwardly, the spring 18 acts to draw the bars 14 and 15 or inner ends thereof, towards each other, resulting in the moving of the member 24 to the position as shown by Figure 5 of the drawings.

Secured to the signaling device is a hook member 28 to which one end of the cable 29 is secured, the cable operating through an opening in the body portion of the vehicle, as clearly shown by Figure 3 of the drawings, one end of the cable having connection with the opening knob 30 provided with an extension 31 disposed within the keeper 32 that is secured to the inner wall of the body portion 5. When it is desired to move the signaling device to its inactive position, it is only necessary to move the knob 30 downwardly against the tension of the coiled spring, whereupon the member 26 will snap into position between adjacent fingers of the member 24

A spring member 33 is secured within the housing and is designed to contact with the lazy tong construction to restrict movement of the same when it is being moved to its inactive position.

Disposed within the member 24 are electric lamps 34 which are in circuit with a suitable source of electric supply through the wires 35, the circuits being controlled by means of the switches 36 arranged in proximity to the driver's seat, and the switch including stationary contact member 37 and the movable contact member 38, the latter moves into engagement with member 37 to complete the circuit. It is contemplated to use various colored lamps in the member 24 to warn persons moving in proximity to the vehicle, of certain movements to be taken by the vehicle.

What is claimed is:—

A signaling device including a housing, a lazy tong construction pivotally supported within the housing, said lazy tong construction including pivotally connected bars, a coiled spring disposed between the inner ends of the inner arms of the lazy tong construction to urge the arms towards each other, and cause the device to be extended from the housing, means for returning the device to its inactive position, a spring arm for contacting with the device to hold the same in its inactive position, means for releasing the arm, and a transparent member carried at the outer end of the device.

In testimony that we claim the foregoing as our own, we have hereto affixed our signatures in the presence of two witnesses.

JOHN BRANDENBERG.
WALTER W. SMITH.

Witnesses:
LUCY M. BRANDENBERG,
ANNA L. RYAN.